(12) United States Patent
Cho et al.

(10) Patent No.: US 11,059,929 B2
(45) Date of Patent: Jul. 13, 2021

(54) COPOLYMER INCLUDING FUNCTIONAL MONOMER AND METHOD OF PREPARING THE SAME

(71) Applicant: Korea Kumho Petrochemical Co., Ltd., Seoul (KR)

(72) Inventors: Hanjoung Cho, Daejeon (KR); Jae Young Ko, Daejeon (KR); Tae Hee Kim, Daejeon (KR); Cheol Min Park, Daejeon (KR)

(73) Assignee: Korea Kumho Petrochemical Co., Ltd., Seoul (KR)

(*) Notice: Subject to any disclaimer, the term of this patent is extended or adjusted under 35 U.S.C. 154(b) by 61 days.

(21) Appl. No.: 16/369,717

(22) Filed: Mar. 29, 2019

(65) Prior Publication Data

US 2019/0300638 A1    Oct. 3, 2019

(30) Foreign Application Priority Data

Mar. 29, 2018  (KR) .................. 10-2018-0036873

(51) Int. Cl.
| | |
|---|---|
| *B60C 1/00* | (2006.01) |
| *C08F 236/14* | (2006.01) |
| *C08L 55/00* | (2006.01) |

(52) U.S. Cl.
CPC ........... *C08F 236/14* (2013.01); *B60C 1/0016* (2013.01); *C08L 55/00* (2013.01); *C08F 2800/10* (2013.01); *C08F 2810/40* (2013.01)

(58) Field of Classification Search
CPC ....... C08F 236/10; C08F 297/04; C08C 19/25; B60C 1/00; B60C 1/0016; B60C 1/0025
See application file for complete search history.

(56) References Cited

U.S. PATENT DOCUMENTS

| | | |
|---|---|---|
| 2004/0011663 A1 | 1/2004 | Bossoutrot |
| 2010/0152369 A1 | 6/2010 | Shibata et al. |
| 2016/0122480 A1* | 5/2016 | Cho ................... C08C 19/22 524/111 |

FOREIGN PATENT DOCUMENTS

| | | |
|---|---|---|
| JP | 03-095209 A | 4/1991 |
| JP | 2012-167207 A | 9/2012 |
| JP | 5244064 B2 | 7/2013 |
| KR | 10-1700954 B1 | 1/2017 |
| KR | 10-2018-0002683 A | 1/2018 |

* cited by examiner

*Primary Examiner* — Kuo Liang Peng
(74) *Attorney, Agent, or Firm* — Novick, Kim & Lee, PLLC; Jae Youn Kim

(57) ABSTRACT

Provided is a copolymer composed of an aromatic vinyl monomer, a conjugated diene monomer, and a functional monomer including two or more nitrogen atoms and a method of preparing the copolymer.

16 Claims, No Drawings

COPOLYMER INCLUDING FUNCTIONAL MONOMER AND METHOD OF PREPARING THE SAME

CROSS-REFERENCE TO RELATED APPLICATION

This application claims the priority benefit of Korean Patent Application No. 10-2018-0036873, filed on Mar. 29, 2018 in the Korean Intellectual Property Office, the disclosure of which is incorporated herein by reference.

BACKGROUND OF THE DISCLOSURE

Field of the Disclosure

The present disclosure relates to a copolymer including a functional monomer and a method of preparing the same.

Description of the Related Art

Recently, various studies have been conducted to develop a high-performance tire rubber having dynamic properties such as rotational resistance and wet resistance, mechanical properties and processability as interest in a high-performance tire that is eco-friendly and is capable of saving energy has increased.

Styrene-butadiene rubber (hereinafter referred to as "SBR") or butadiene rubber (hereinafter referred to as "BR") is generally used as rubber for tires. These types of rubber are mainly prepared by a solution polymerization method.

A solution polymerization method, which is characterized by polymerizing a monomer in a solvent using an organometallic compound as an initiator to produce rubber, allows control of the structure, coupling ratio, and the like of a monomer or a polymer. In addition, polymers prepared by the solution polymerization method exhibit excellent rotational resistance and wet resistance. Accordingly, the solution polymerization method has been widely used as a method of preparing a tire rubber.

In addition, since a functional group can be introduced into a portion of a polymer using a modifier by the solution polymerization method, cold flow can be controlled at room temperature and processability and dispersibility can be improved upon mixing with a reinforcing agent. In particular, compatibility with a reinforcing agent, such as carbon black or silica, used to mix a tire rubber composition increases, whereby dynamic properties, such as abrasion resistance, rotational resistance, and wet resistance, of a tire can be improved.

A method of substituting a terminal of a copolymer with an alkoxysilane-based compound was proposed so as to improve compatibility with a reinforcing agent, e.g., silica or carbon black. However, this method has a problem that an alkoxysilane group at a terminal of a polymer is hydrolyzed by steam or hot water in a stripping step of evaporating a solvent and thus Si—O—Si bonds are generated between polymers, which causes a rapid increase in Mooney viscosity.

US Patent Laid-Open Publication No. 2010-0152369 discloses that hysteresis of a produced tire can be reduced by using an alkoxysilane-based compound, which includes a primary amine substituted with a hydrolyzable protective group, as a terminal modifier, but there is an economical limit due to application of the protective group.

Therefore, it is necessary to develop a copolymer for tire rubber capable of increasing compatibility or mixability with a reinforcing agent through terminal modification and improving mechanical and dynamic properties of a produced tire.

SUMMARY OF THE DISCLOSURE

Therefore, the present disclosure has been made in view of the above problems, and it is one object of the present disclosure to provide a copolymer capable of improving mechanical properties and dynamic properties of a tire as a final product while increasing compatibility with a reinforcing agent such as silica or carbon black.

In accordance with an aspect of the present disclosure, the above and other objects can be accomplished by the provision of a copolymer, including an aromatic vinyl monomer, a conjugated diene monomer, and a functional monomer(s) represented by one or more of Formulas 1 to 3 below:

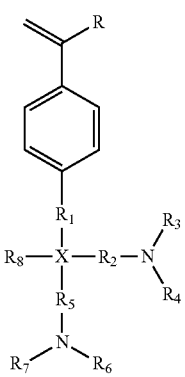

<Formula 1>

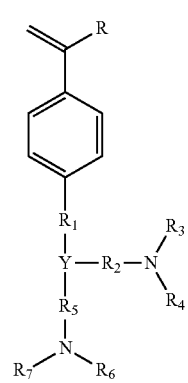

<Formula 2>

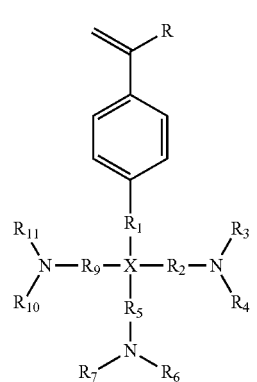

<Formula 3> wherein N is nitrogen,

X is carbon or silicon,

Y is nitrogen, boron, or phosphorus,

R is hydrogen or a C1 to C20 alkyl group, each of $R_1$, $R_2$, $R_5$, and $R_9$ is a C1 to C20 saturated or unsaturated hydrocarbon chain, and each of $R_3$, $R_4$, $R_6$, $R_7$, $R_8$, $R_{10}$, and $R_{11}$ is a C1 to C20 alkyl group.

In an embodiment, the aromatic vinyl monomer may be styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene including a tertiary amine, styrene including a primary, secondary, or tertiary amine, and a combination of two or more thereof.

In an embodiment, the conjugated diene monomer may be one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

In an embodiment, at least one terminal of the copolymer may be modified with an aminoalkoxysilane compound.

In an embodiment, the aminoalkoxysilane compound may be represented by Formula 4 below:

$(R'O)_x SiR''_{4-x}$   <Formula 4> wherein R' is a C1 to C20 alkyl group,

R'' is a C1 to C20 saturated or unsaturated hydrocarbon chain or a C1 to C20 saturated or unsaturated hydrocarbon chain including a nitrogen, sulfur, or halogen atom, and x is an integer of 1 to 3.

In an embodiment, the aminoalkoxysilane compound may be represented by Formula 5 below:

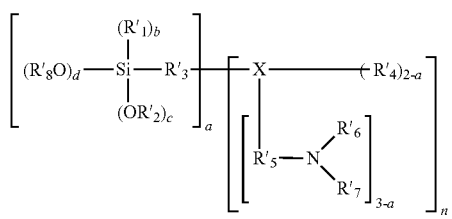

<Formula 5> wherein each of $R'_1$ to $R'_8$ is a C1 to C20 saturated or unsaturated hydrocarbon chain, X is carbon, silicon, or nitrogen, a is 1 or 2, each of b, c, and d is an integer of 0 to 3 satisfying b+c+d=3, and n is an integer of 1 to 200.

In an embodiment, the aminoalkoxysilane compound may be represented by Formula 6 below:

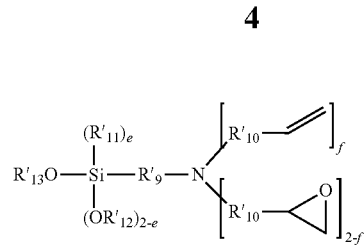

<Formula 6> wherein each of $R'_9$ and $R'_{10}$ is a C1 to C20 saturated or unsaturated hydrocarbon chain or a C1 to C20 saturated or unsaturated hydrocarbon chain including a nitrogen, sulfur, or halogen atom, each of $R'_{11}$ to $R'_{13}$ is a C1 to C20 alkyl group, and each of e and f is an integer of 0 to 2.

In an embodiment, the content of the functional monomer may be 0.1 to 10% by weight based on a total weight of the copolymer.

In accordance with another aspect of the present disclosure, there is provided a tire rubber composition including the copolymer.

In accordance with still another aspect of the present disclosure, there is provided a method of preparing a copolymer, the method including polymerizing an aromatic vinyl monomer, a conjugated diene monomer, and a functional monomer(s) represented by one or more of Formulas 1 to 3 below in the presence of a solvent, a Lewis base, and a polymerization initiator:

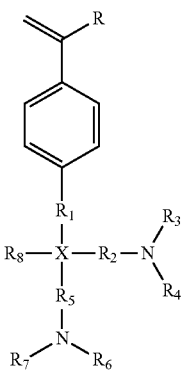

<Formula 1>

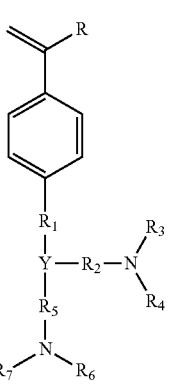

<Formula 2>

-continued

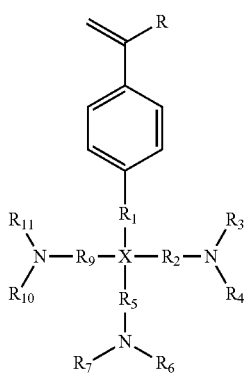

<Formula 3> wherein

N is nitrogen,

X is carbon or silicon,

Y is nitrogen, boron, or phosphorus,

R is hydrogen or a C1 to C20 alkyl group, each of $R_1$, $R_2$, $R_5$, and $R_9$ is a C1 to C20 saturated or unsaturated hydrocarbon chain, and each of $R_3$, $R_4$, $R_6$, $R_7$, $R_8$, $R_{10}$, and $R_{11}$ is a C1 to C20 alkyl group.

In an embodiment, the solvent may be one selected from the group consisting of aliphatic hydrocarbons, cyclic aliphatic hydrocarbons, aromatic hydrocarbons, and a combination of two or more thereof.

In an embodiment, the Lewis base may be one selected from the group consisting of tetrahydrofuran, di-n-propyl ether, diisopropyl ether, diethyl ether, diethylene glycol dimethyl ether, di-n-butyl ether, ethyl butyl ether, triethylene glycol, 1,2-dimethoxybenzene, ditetrahydrofurylpropane, ditetrahydrofurfurylpropane, ethyltetrahydrofurfurylether, trimethylamine, triethylamine, N,N,N,N-tetramethylethylenediamine, and a combination of two or more thereof.

In an embodiment, the polymerization initiator may be one selected from the group consisting of an organometallic compound, an amine compound, an imine compound, and a combination of two or more thereof.

In an embodiment, a use amount of the polymerization initiator may be 0.01 to 10 mmol per 100 g of a total of monomers including the aromatic vinyl monomer, the conjugated diene monomer, and the functional monomer.

In an embodiment, the method may further include modifying at least one terminal of the copolymer with an aminoalkoxysilane compound.

In an embodiment, a use amount of the aminoalkoxysilane compound may be 0.5 to 5.0 moles per 1 mole of the polymerization initiator.

DETAILED DESCRIPTION OF THE DISCLOSURE

Hereinafter, the present disclosure is described with reference to the accompanying drawings. However, the present disclosure may be implemented in various different forms and is not limited to the following embodiments.

In the specification, when it is described that a certain part is "connected" to another part, it should be understood that the certain part may be directly connected to the other part or electrically connected to the other part via another part in the middle. In addition, when a certain part "includes" a certain component, this indicates that the part may further include another component instead of excluding the other component unless specifically stated otherwise.

Copolymer

An aspect of the present disclosure provides a copolymer composed of an aromatic vinyl monomer, a conjugated diene monomer, and a functional monomer(s) represented by one or more of Formulas 1 to 3 below:

<Formula 1>

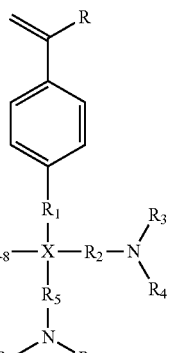

<Formula 2>

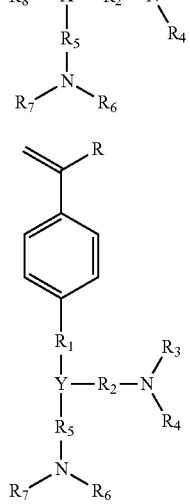

<Formula 3>

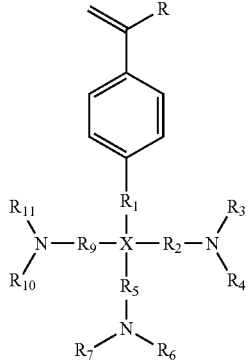

wherein N is nitrogen, X is carbon or silicon, Y is nitrogen, boron, or phosphorus, R is hydrogen or a C1 to C20 alkyl group, each of $R_1$, $R_2$, $R_5$, and $R_9$ is a C1 to C20 saturated or unsaturated hydrocarbon chain, and each of $R_3$, $R_4$, $R_6$, $R_7$, $R_8$, $R_{10}$, and $R_{11}$ is a C1 to C20 alkyl group.

The aromatic vinyl monomer may be one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl) dimethylaminoethylether, vinylpyridine, vinylxylene, diphenylethylene, diphenylethylene including a tertiary amine, styrene including a primary, secondary, or tertiary amine, and a combination of two or more thereof, preferably styrene, but the present disclosure is not limited thereto.

The conjugated diene monomer may be one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof, preferably 1,3-butadiene, but the present disclosure is not limited thereto.

The content of the aromatic vinyl monomer in the copolymer may be 5 to 45% by weight. When the content of the aromatic vinyl monomer is within the range, the glass transition temperature (Tg) of a polymer increases, whereby dynamic properties, such as wet resistance, rotational resistance, and braking force, required for tires may be satisfied and gas mileage (fuel efficiency) may be improved upon application to a tire.

Since the functional monomer includes two or more nitrogen atoms, two or more tertiary amine groups (amine groups) may be introduced into a side chain of the copolymer. The tertiary amine group forms a hydrogen bond with a reinforcing agent, silica, upon mixing of a rubber composition so that the copolymer and the silica are adjacent to each other. When at least one terminal of the copolymer is modified with an alkoxysilane-based compound, preferably an aminoalkoxysilane compound, a covalent bond may be formed between an alkoxysilane group of the copolymer and the silica. The hydrogen bond and the covalent bond may enhance the bonding force between the copolymer and the silica, whereby dynamic properties, such as wet resistance and rotational resistance, and mechanical properties required for a tire, particularly a tire tread, may be improved.

The functional monomer represented by one of Formulas 1 to 3 may be, for example, N1-(3-(dimethylamino)propyl)-N3,N3-dimethyl-N1-(4-vinylbenzyl)propane-1,3-diamine; N1-(3-(dimethylamino)propyl)-N3,N3-dimethyl-N1-(4-vinylphenethyl)propane-1,3-diamine; N1-(2-(dimethylamino)ethyl)-N2,N2-dimethyl-N1-(4-vinylbenzyl)ethane-1,2-diamine; N1-(3-(diethylamino)propyl)-N3,N3-diethyl-N1-(4-vinylbenzyl)propane-1,3-diamine, or the like, but the present disclosure is not limited thereto.

The content of the functional monomer in the copolymer may be 0.1 to 10% by weight, preferably 0.1 to 5% by weight, more preferably 0.1 to 3% by weight. When the content of the functional monomer is less than 0.1% by weight, it is difficult to achieve compatibility with a reinforcing agent to a required level. When the content of the functional monomer is greater than 10% by weight, production costs may increase because a large amount of the functional monomer is used.

At least one terminal of the copolymer may be modified with an aminoalkoxysilane compound.

The aminoalkoxysilane compound(s) may be represented by one or more of Formulas 4 to 6 below:

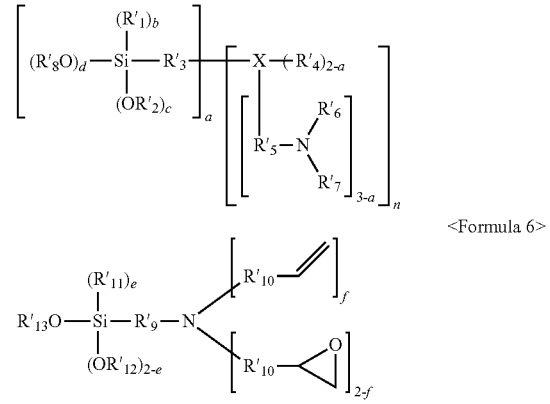

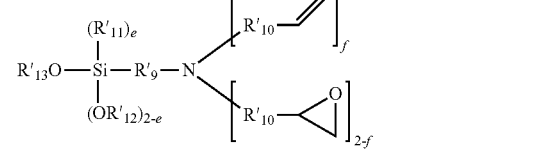

In Formula 4, R' is a C1 to C20 alkyl group, R" is a C1 to C20 saturated or unsaturated hydrocarbon chain or a C1 to C20 saturated or unsaturated hydrocarbon chain including a nitrogen, sulfur, or halogen atom, and x is an integer of 1 to 3.

The compound represented by Formula 4 may be, for example, (N,N-diethyl-3-aminopropyl)trimethoxysilane, (N,N-dimethyl-3-aminopropyl)trimethoxysilane, 3-chloropropyltriethoxysilane, 3-chloropropylmethyldiethoxysilane, 3-aminopropyltriethoxysilane, N-(2-aminoethyl)-3-aminopropyltrimethoxysilane, 3-aminopropylmethyldiethoxysilane, trimethoxysilylpropanethiol, 3-glycidyloxypropylmethyldiethoxysilane, 3-glycidyloxypropyltriethoxysilane, 3-glycidyloxypropylmethyldimethoxysilane, 3-glycidyloxypropyltrimethoxysilane, or vinyltriethoxysilane, but the present disclosure is not limited thereto.

In Formula 5, each of $R'_1$ to $R'_8$ is a C1 to C20 saturated or unsaturated hydrocarbon chain, X is carbon, silicon, or nitrogen, a is 1 or 2, each of b, c, and d is an integer of 0 to 3 satisfying b+c+d=3, and n is an integer of 1 to 200.

In particular, when a is 1 in Formula 5, X has an $sp^3$ hybrid structure, and nitrogen atoms are respectively introduced into two branches extending from one X to generate two or more tertiary amine groups. Accordingly, the conjugated diene-based polymer and a reinforcing agent, silica, become adjacent to each other due to a hydrogen bond between the silica and the tertiary amine group upon mixing of a rubber composition. In this case, a covalent bond may be formed between the alkoxysilane group of the conjugated diene-based polymer and the silica. The hydrogen bond and the covalent bond may enhance chemical bonding between the copolymer and silica, thereby improving dynamic properties, such as wet resistance and rotational resistance, and mechanical properties required for a tire, particularly, a tire tread.

The compound represented by Formula 5 may be, for example, $N^1,N^1$-diethyl-$N^2,N^2$-bis(3-(trimethoxysilyl)propyl)ethane-1,2-diamine, or 6-(2-(dimethylamino)ethyl)-$N^1$, $N^1,N^{10},N^{10}$-tetramethyl-3-(3-(trimethoxysilyl)propyl)decane-1,10-diamine, but the present disclosure is not limited thereto.

In Formula 6, each of $R'_9$ and $R'_{10}$ is a C1 to C20 saturated or unsaturated hydrocarbon chain or a C1 to C20 saturated or unsaturated hydrocarbon chain including a nitrogen, sulfur, or halogen atom, each of $R'_{11}$ to $R'_{13}$ is a C1 to C20 alkyl group, and each of e and f is an integer of 0 to 2.

When a rubber composition is mixed using a copolymer modified with the compound represented by Formula 6, the copolymer and a reinforcing agent, silica, become adjacent to each other due to a hydrogen bond between the silica and an amine group. In this case, a covalent bond may be formed between the alkoxysilane group of the copolymer and the silica. In addition, an allyl group and/or an epoxy group may enhance crosslinking between the copolymer and silica, thereby increasing dynamic properties, such as gripability and rotational resistance, and mechanical properties required for a tire tread.

The compound represented by Formula 6 may be, for example, N,N-diallylaminopropyltrimethoxysilane or N,N-diglycidoxypropyltrimethoxysilane, but the present disclosure is not limited thereto.

The aminoalkoxysilane compound may be used in an amount of 0.5 to 5.0 moles per 1 mol of a polymerization initiator, e.g., an organometallic compound, used to prepare the copolymer. When a use amount of the aminoalkoxysilane compound is less than 0.5 moles per 1 mole of the organometallic compound, a bonding force to a reinforcing agent may be decreased. When a use amount of the aminoalkoxysilane compound is greater than 5.0 moles per 1 mole of the organometallic compound, production costs may increase due to excessive use of the modifier.

The copolymer may have a weight average molecular weight (Mw) of 100,000 to 500,000, preferably 200,000 to 300,000. The 100° C. Mooney viscosity of the copolymer may be 20 to 200, preferably 50 to 100. In a microstructure of the copolymer, a vinyl content per a butadiene unit may be 10 to 90 mol %, preferably 40 to 70 mol %.

Tire Rubber Composition

Another aspect the present disclosure provides a tire rubber composition including the copolymer, preferably a tire tread rubber composition including the copolymer.

A tire rubber manufactured from the tire rubber composition may have a tensile strength of 200 kgf/cm$^2$ or more, preferably 200 to 250 kgf/cm$^2$, a 300% modulus of 150 kgf/cm$^2$ or more, preferably 150 to 200 kgf/cm$^2$, an elongation rate of 350% or more, and a bound rubber content of 60% by weight or more, preferably 60 to 85% by weight.

Copolymer Preparation Method

The copolymer may be prepared by solution-polymerizing an aromatic vinyl monomer, a conjugated diene monomer, and the functional monomer(s) represented by one or more of Formulas 1 to 3 in the presence of a solvent, a Lewis base, and a polymerization initiator. The solution-polymerization may be performed continuously or batchwise, preferably batchwise, but the present disclosure is not limited thereto.

The solvent may be one selected from the group consisting of aliphatic hydrocarbons, cyclic aliphatic hydrocarbons, aromatic hydrocarbons, and a combination of two or more thereof, preferably one selected from the group consisting of n-pentane, n-hexane, n-heptane, isooctane, cyclohexane, methylcyclopentane, toluene, benzene, xylene, and a combination of two or more thereof, more preferably cyclohexane, but the present disclosure is not limited thereto.

The Lewis base, which is used to control a microstructure of a polymer, may be one selected from the group consisting of tetrahydrofuran, di-n-propyl ether, diisopropyl ether, diethyl ether, diethylene glycol dimethyl ether, di-n-butyl ether, ethyl butyl ether, triethylene glycol, 1,2-dimethoxybenzene, ditetrahydrofurylpropane, ditetrahydrofurfurylpropane, ethyltetrahydrofurfurylether, trimethylamine, triethylamine, N,N,N,N-tetramethylethylenediamine, and a combination of two or more thereof, preferably one selected from the group consisting of ethyltetrahydrofurfurylether, tetrahydrofuran, ditetrahydrofurfurylpropane, ditetrahydrofurylpropane, N,N,N,N-tetramethylethylenediamine, and a combination of two or more thereof, but the present disclosure is not limited thereto. The use amount of the Lewis base may be adjusted according to a molar number of total anions and a desired content of vinyl in a copolymer at an initiation temperature.

The polymerization initiator may be an organometallic compound, an amine or imine compound, or a combination thereof. The organometallic compound may be one selected from the group consisting of an organic lithium compound, an organic sodium compound, an organic potassium compound, an organic rubidium compound, an organic cesium compound, and a combination of two or more thereof, preferably an organic lithium compound, more preferably an alkyl lithium compound having a C1 to 20 alkyl group. The alkyl lithium compound may be one selected from the group consisting of methyllithium, ethyllithium, isopropyllithium, n-butyllithium, sec-butyllithium, tert-butyllithium, and a combination of two or more thereof, preferably n-butyllithium or sec-butyllithium, but the present disclosure is not limited thereto. A use amount of the organometallic compound depends upon a target molecular weight of the copolymer. In general, the organometallic compound may be used in an amount of 0.01 to 10 mmol, preferably 0.1 to 3.0 mmol, per 100 g of a monomer.

The amine or imine compound may be one selected from the group consisting of, for example, dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-ethylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azepine, hexamethyleneimine, heptamethyleneimine, 5-benzyloxyindole, 3-azaspiro[5,5]undecane, 3-azabicyclo[3,2,2]nonane, carbazole, and a combination of two or more thereof, but the present disclosure is not limited thereto.

The types, contents (use amounts), and action effects of the aromatic vinyl monomer, the conjugated diene monomer, and the functional monomer are the same as those described above. During the solution polymerization, a total content of the monomers in the solvent may be 5 to 50% by weight, preferably 10 to 25% by weight. When a total content of the monomers is less than 5% by weight, a production yield of a copolymer may be decreased due to excessive use of a solvent. When a total content of the monomers is greater than 50% by weight, it is difficult to control the viscosity and reaction heat of a solution.

An initiation temperature of the solution polymerization may be about 10 to 100° C., preferably about 20 to 90° C. When the initiation temperature is less than 10° C., the viscosity of the solution rapidly increases as the reaction progresses, and thus a reaction rate decreases, which is economically disadvantageous. When the initiation temperature is higher than 100° C., it is difficult to control the reaction. In addition, a reaction pressure may be 0.5 to 10 kgf/cm$^2$. In general, polymerization may be performed for a sufficient time until all monomers are converted into a polymer, preferably until a polymerization conversion rate of monomers reaches about 99%.

As needed, at least one terminal of the copolymer may be modified with the aminoalkoxysilane compound(s) represented by one or more of Formulas 4 to 6 without termination of the polymerization in the solution polymerization step. This process may be performed continuously or batchwise, preferably batchwise, but the present disclosure is not limited thereto.

The type, content (use amount), and action effect of the aminoalkoxysilane compound are the same as those described above.

Hereinafter, embodiments of the present disclosure are described in detail.

Example 1

80 g of styrene, 307 g of 1,3-butadiene, 4 g of N1-(3-(dimethylamino)propyl)-N3,N3-dimethyl-N1-(4-vinylbenzyl)propane-1,3-diamine, 2,200 g of cyclohexane, and 10 ml of tetrahydrofuran were fed into a 5 L reactor, and then an internal temperature of the reactor was adjusted to 35° C. while stirring. When the internal temperature of the reactor reached 35° C., 2.4 mmol of n-butyllithium was fed thereinto to perform adiabatic temperature-rise polymerization. Here, the progress of the polymerization was observed through a change in a reaction temperature, and a small amount of reaction product was sampled at each reaction step to analyze a polymerization conversion rate of monomers.

When a polymerization conversion rate reached 99%, 9 g of 1,3-butadiene was fed into the reactor to substitute a reactive terminal with 1,3-butadiene, and then 2.7 mmol of 3-aminopropyltriethoxysilane, as a terminal modifier, was fed into the reactor and allowed to stand for a predetermined time.

When the terminal modification was completed, 4 g (1 part by weight based on 100 parts by weight of a rubber) of butylated hydroxy toluene (BHT) was added to terminate the reaction, followed by stripping and roll drying to remove the remaining solvent and water. As a result, a polymer was obtained.

Example 2

A polymer was obtained in the same manner as in Example 1, except that N1-(3-(dimethylamino)propyl)-N3,N3-dimethyl-N1-(4-vinylphenethyl)propane-1,3-diamine was added instead of N1-(3-(dimethylamino)propyl)-N3,N3-dimethyl-N1-(4-vinylbenzyl)propane-1,3-diamine.

Example 3

A polymer was obtained in the same manner as in Example 1, except that N1-(2-(dimethylamino)ethyl)-N2,N2-dimethyl-N1-(4-vinylbenzyl)ethane-1,2-diamine was added instead of N1-(3-(dimethylamino)propyl)-N3,N3-dimethyl-N1-(4-vinylbenzyl)propane-1,3-diamine.

Example 4

A polymer was obtained in the same manner as in Example 1, except that N1-(3-(diethylamino)propyl)-N3,N3-diethyl-N1-(4-vinylbenzyl)propane-1,3-diamine was added instead of N1-(3-(dimethylamino)propyl)-N3,N3-dimethyl-N1-(4-vinylbenzyl)propane-1,3-diamine.

Comparative Example 1

A polymer was obtained in the same manner as in Example 1, except that 84 g of styrene, 307 g of 1,3-butadiene, 2,200 g of cyclohexane, and 10 ml of tetrahydrofuran were fed into a 5 L reactor.

Comparative Example 2

A polymer was obtained in the same manner as in Example 1, except that 1-(4-vinylbenzyl)piperidine was added instead of N1-(3-(dimethylamino)propyl)-N3,N3-dimethyl-N1-(4-vinylbenzyl)propane-1,3-diamine.

Comparative Example 3

A polymer was obtained in the same manner as in Example 1, except that 1-(4-vinylbenzyl)pyrrolidone was added instead of N1-(3-(dimethylamino)propyl)-N3,N3-dimethyl-N1-(4-vinylbenzyl)propane-1,3-diamine.

Experimental Example 1

The characteristics of the polymers prepared according to the examples and the comparative examples are summarized in Table 1 below. In Table 1 below, styrene contents and vinyl contents are represented by mol % calculated using NMR analysis results, and weight average molecular weights were measured by gel permeation chromatography (GPC).

TABLE 1

| Classification | Weight average molecular weight (Mw) | Mooney viscosity (ML$_{1+4}$, 100° C.) | Styrene content (mol %) | Vinyl content in BD unit (mol %) |
|---|---|---|---|---|
| Example 1 | 252,000 | 65 | 28.7 | 58.7 |
| Example 2 | 247,000 | 64 | 29.1 | 58.9 |
| Example 3 | 249,000 | 65 | 28.8 | 58.5 |
| Example 4 | 247,000 | 64 | 29.0 | 58.8 |
| Comparative Example 1 | 250,000 | 63 | 27.9 | 58.0 |
| Comparative Example 2 | 251,000 | 66 | 28.3 | 58.4 |
| Comparative Example 3 | 250,000 | 67 | 28.1 | 58.6 |

Experimental Example 2

Each of the polymers (solution styrene-butadiene rubber, SSBR) prepared according to the examples and the comparative examples was mixed with silica in a 500 cc lab mixer according to a condition summarized in Table 2 below, thereby preparing a tire rubber composition. A mixed rubber was prepared using the tire rubber composition by means of an open twin-screw roll mill, followed by vulcanizing at 165° C. for 20 minutes. As a result, a rubber specimen was produced.

TABLE 2

| Composition of mixture | Content (phr) |
|---|---|
| SSBR | 80 |
| High cis BR | 20 |
| Stearic acid | 2 |
| Zinc oxide | 3 |
| Silica | 80 |
| Oil | 10 |
| Si-69 | 6.4 |
| CZ | 1 |

TABLE 2-continued

| Composition of mixture | Content (phr) |
|---|---|
| DPG | 1.5 |
| Sulfur | 1.5 |

High cis BR: KBR01(KUMHO PETROCHEMICAL)
Silica: Degussa 7000GR
Si-69: Bis-(triethoxysilylpropyl)tetrasulfide
Oil: TDEA Oil
CZ: N-cyclohexyl benzothiazyl sulfenamide
DPG: 1,3-diphenylguanidine Processability, mechanical properties, and dynamic properties of the prepared tire rubber compositions and rubber specimens were measured. Results are summarized in Table 3 below. Properties were measured as follows.

Hardness: Measured using a SHORE-A hardness tester
Tensile strength, 300% modulus, and elongation rate: Measured using a universal test machine (UTM) according to ASTM 3189 Method B
Dynamic property value of vulcanized rubber (Tan δ): Analyzed at a frequency of 10 Hz under a strain condition of 0.2 using a DTMA 5 device manufactured by Rheometic

TABLE 3

| Classification | Example 1 | Example 2 | Example 3 | Example 4 | Comparative Example 1 | Comparative Example 2 | Comparative Example 3 |
|---|---|---|---|---|---|---|---|
| Mooney viscosity (100° C.) | 101 | 103 | 101 | 102 | 99 | 102 | 103 |
| Hardness | 74 | 73 | 76 | 74 | 72 | 75 | 74 |
| Tensile strength (kgf/cm$^2$) | 216 | 214 | 215 | 213 | 120 | 192 | 187 |
| 300% modulus (kgf/cm$^2$) | 156 | 155 | 157 | 155 | 110 | 140 | 136 |
| Elongation rate (%) | 370 | 375 | 370 | 360 | 305 | 340 | 345 |
| Glass transition temperature (° C.) | −8.7 | −8.5 | −9.0 | −8.8 | −8.0 | −8.3 | −8.2 |
| Tan δ @0° C. | 0.7243 | 0.7235 | 0.7246 | 0.7244 | 0.6039 | 0.6568 | 0.6478 |
| Tan δ @60° C. | 0.0789 | 0.0792 | 0.0791 | 0.7590 | 0.0958 | 0.0897 | 0.0904 |
| Bound rubber content (% by weight) | 79 | 78 | 77 | 76 | 37 | 51 | 56 |
| Cold flow (mg/min) | 0.44 | 0.44 | 0.43 | 0.45 | 1.1 | 0.9 | 0.9 |

Referring to Table 3, in the case of the tire rubber composition and rubber specimen including the polymer prepared by copolymerizing styrene, butadiene, and the functional monomer having two or more nitrogen atoms (Examples 1 to 4), the content of the bound rubber was about 70% by weight or more, preferably about 70 to 80% by weight. Accordingly, the interaction with silica used as a filler was significantly improved, and thus mechanical properties such as tensile strength and a 300% modulus were remarkably improved, compared to the case wherein the functional monomer was not used (Comparative Example 1) and the case wherein the functional monomer having one nitrogen atom was used (Comparative Examples 2 and 3).

In addition, the wet resistance (Tan δ @0° C.) of the rubber specimen manufactured according to Example 1 was increased by about 20%, 16%, and 15%, respectively, compared with Comparative Examples 1, 2, and 3, and the rotational resistance (Tan δ @60° C.) thereof was increased by about 23%, 18%, and 12%, respectively, compared to Comparative Examples 1, 2, and 3. These results indicate that the rubber specimen can be usefully applied to a tire tread.

As apparent from the above description, a copolymer according to an aspect of the present disclosure, which is prepared by copolymerizing an aromatic vinyl monomer, a conjugated diene monomer, and a functional monomer having two or more nitrogen atoms, can improve compatibility with a reinforcing agent such as silica or carbon black upon mixing of a tire rubber composition and improve the mechanical properties and dynamic properties of a tire as a final product.

Since the copolymer is prepared by polymerizing a functional monomer having a functional group for increasing compatibility with a reinforcing agent along with an aromatic vinyl monomer and a conjugated diene monomer in a polymerization step, the effects can be accomplished without additional modification with a terminal modifier as in conventional cases. As needed, compatibility with a reinforcing agent and mechanical properties and dynamic properties of a tire can be further improved by modifying at least one terminal of the copolymer with an aminoalkoxysilane compound.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A copolymer, comprising an aromatic vinyl monomer, a conjugated diene monomer, and a functional monomer represented by one or more of Formulas 1 to 3 below:

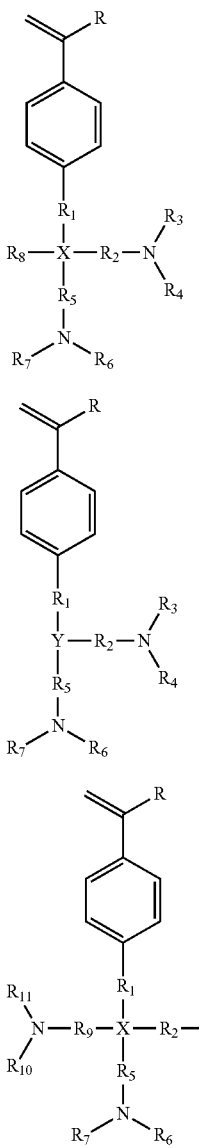

<Formula 1>

<Formula 2>

<Formula 3> wherein N is nitrogen,
X is carbon or silicon,
Y is nitrogen, boron, or phosphorus,
R is hydrogen or a C1 to C20 alkyl group,
each of $R_1$, $R_2$, $R_5$, and $R_9$ is a C1 to C20 saturated or unsaturated hydrocarbon chain, and
each of $R_3$, $R_4$, $R_6$, $R_7$, $R_8$, $R_{10}$, and $R_{11}$ 1 is a C1 to C20 alkyl group.

2. The copolymer according to claim 1, wherein the aromatic vinyl monomer is one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzyl)dimethylaminoethylether, vinylpyridine, vinylxylene, diphenylethylene, diphenylethylene comprising a tertiary amine, styrene comprising a primary, secondary, or tertiary amine, and a combination of two or more thereof.

3. The copolymer according to claim 1, wherein the conjugated diene monomer is one selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene, and a combination of two or more thereof.

4. The copolymer according to claim 1, wherein at least one terminal of the copolymer is modified with an alkoxysilane compound.

5. The copolymer according to claim 4, wherein the alkoxysilane compound is represented by Formula 4 below:

$$(R'O)_x SiR''_{4-x}$$  <Formula 4> wherein R' is a C1 to C20 alkyl group,
R'' is a C1 to C20 saturated or unsaturated hydrocarbon chain or a C1 to C20 saturated or unsaturated hydrocarbon chain comprising a nitrogen, sulfur, or halogen atom, and
x is an integer of 1 to 3.

6. The copolymer according to claim 4, wherein the alkoxysilane compound is represented by Formula 5 below:

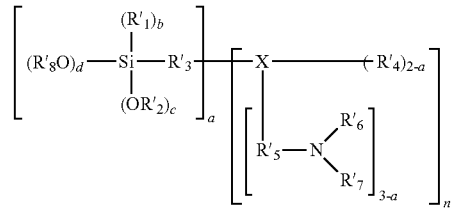

<Formula 5> wherein each of $R'_1$ to $R'_8$ is a C1 to C20 saturated or unsaturated hydrocarbon chain,
X is carbon, silicon, or nitrogen,
a is 1 or 2,
b is 0, 1, or 2,
each of c and d is an integer of 0 to 3 satisfying b+c+d=3, and
n is 1.

7. The copolymer according to claim 4, wherein the alkoxysilane compound is represented by Formula 6 below:

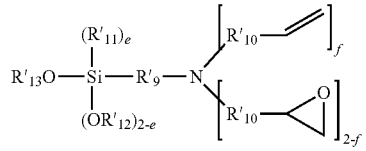

<Formula 6> wherein each of $R'_9$ and $R'_{10}$ is a C1 to C20 saturated or unsaturated hydrocarbon chain or a C1 to C20 saturated or unsaturated hydrocarbon chain comprising a nitrogen, sulfur, or halogen atom,
each of $R'_{11}$ to $R'_{13}$ is a C1 to C20 alkyl group, and
each of e and f is an integer of 0 to 2.

8. The copolymer according to claim 1, wherein the content of the functional monomer is 0.1 to 10% by weight based on a total weight of the copolymer.

9. A tire rubber composition, comprising the copolymer according to claim 1.

10. A method of preparing a copolymer, the method comprising:

polymerizing an aromatic vinyl monomer, a conjugated diene monomer, and a functional monomer represented by one or more of Formulas 1 to 3 below in the presence of a solvent, a Lewis base, and a polymerization initiator:

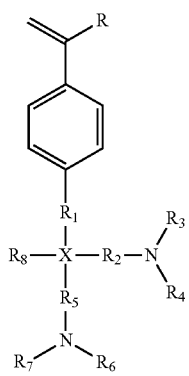

<Formula 1>

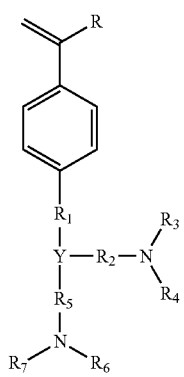

<Formula 2>

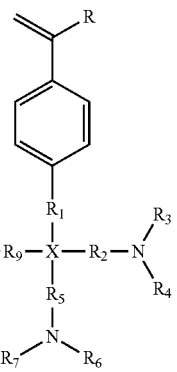

<Formula 3> wherein
N is nitrogen,
X is carbon or silicon,
Y is nitrogen, boron, or phosphorus,
R is hydrogen or a C1 to C20 alkyl group,
each of $R_1$, $R_2$, $R_5$, and $R_9$ is a C1 to C20 saturated or unsaturated hydrocarbon chain, and
each of $R_3$, $R_4$, $R_6$, $R_7$, $R_8$, $R_{10}$, and $R_{11}$ is a C1 to C20 alkyl group.

11. The method according to claim 10, wherein the solvent is one selected from the group consisting of aliphatic hydrocarbons, cyclic aliphatic hydrocarbons, aromatic hydrocarbons, and a combination of two or more thereof.

12. The method according to claim 10, wherein the Lewis base is one selected from the group consisting of tetrahydrofuran, di-n-propyl ether, diisopropyl ether, diethyl ether, diethylene glycol dimethyl ether, di-n-butyl ether, ethyl butyl ether, triethylene glycol, 1,2-dimethoxybenzene, ditetrahydrofurylpropane, ditetrahydrofurfurylpropane, ethyltetrahydrofurfurylether, trimethylamine, triethylamine, N,N,N,N-tetramethylethylenediamine, and a combination of two or more thereof.

13. The method according to claim 10, wherein the polymerization initiator is one selected from the group consisting of an organometallic compound, an amine compound, an imine compound, and a combination of two or more thereof.

14. The method according to claim 10, wherein a use amount of the polymerization initiator is 0.01 to 10 mmol per 100 g of a total of monomers comprising the aromatic vinyl monomer, the conjugated diene monomer, and the functional monomer.

15. The method according to claim 10, further comprising modifying at least one terminal of the copolymer with an alkoxysilane compound.

16. The method according to claim 15, wherein a use amount of the alkoxysilane compound is 0.5 to 5.0 moles per 1 mole of the polymerization initiator.

* * * * *